(12) United States Patent
Kelly et al.

(10) Patent No.: US 6,765,635 B1
(45) Date of Patent: Jul. 20, 2004

(54) APPARATUS AND METHOD FOR ACHROMATIC LIQUID CRYSTAL ELECTRO-OPTIC MODULATION

(75) Inventors: Jack R. Kelly, Stow, OH (US); Haiji J. Yuan, Cupertino, CA (US); Qingyu (Tom) Li, Cupertino, CA (US)

(73) Assignee: CoAdna Photonics, Inc., San Jose, CA (US)

( * ) Notice: Subject to any disclaimer, the term of this patent is extended or adjusted under 35 U.S.C. 154(b) by 188 days.

(21) Appl. No.: 10/035,804

(22) Filed: Dec. 28, 2001

Related U.S. Application Data
(60) Provisional application No. 60/259,076, filed on Dec. 28, 2000.

(51) Int. Cl.[7] .......................... G02F 1/1347; G02F 1/13
(52) U.S. Cl. .......................... 349/76; 349/77; 349/102; 349/117; 349/180; 349/193
(58) Field of Search .............................. 349/74, 76, 77, 349/81, 117, 102, 121, 180, 193

(56) References Cited

U.S. PATENT DOCUMENTS

| 4,720,171 | A | | 1/1988 | Baker |
| 4,720,172 | A | | 1/1988 | Baker |
| 5,015,017 | A | | 5/1991 | Geary |
| 5,015,057 | A | | 5/1991 | Rumbaugh et al. |
| 5,276,747 | A | | 1/1994 | Pan |
| 5,578,241 | A | * | 11/1996 | Plach et al. ............ 252/299.01 |
| 5,658,490 | A | | 8/1997 | Sharp et al. |
| 6,028,656 | A | * | 2/2000 | Buhrer et al. ............... 349/196 |
| 6,111,633 | A | | 8/2000 | Albert et al. |
| 6,141,071 | A | | 10/2000 | Sharp |
| 6,141,076 | A | * | 10/2000 | Liu et al. ..................... 349/134 |
| 6,437,843 | B1 | * | 8/2002 | Van De Witte et al. .... 349/117 |

* cited by examiner

Primary Examiner—Toan Ton
Assistant Examiner—Tai Duong
(74) Attorney, Agent, or Firm—Cooley Godward LLP

(57) ABSTRACT

An achromatic half wave plate includes a first twisted nematic liquid crystal layer, a second twisted nematic liquid crystal layer, and a uniaxial half wave plate between the first twisted nematic liquid crystal layer and the second twisted nematic liquid crystal layer. In one embodiment the first twisted nematic liquid crystal layer and the second twisted nematic liquid crystal layer have an identical twist angle of 135 degrees. The optic axis at the entrance of the first twisted nematic liquid crystal layer is substantially orthogonal to the optic axis at the exit of the second twisted nematic liquid crystal layer.

17 Claims, 10 Drawing Sheets

APPARATUS AND METHOD FOR ACHROMATIC LIQUID CRYSTAL ELECTRO-OPTIC MODULATION

This application claims priority to the U.S. provisional patent application entitled, "Achromatic Liquid Crystal Electro-Optic Modulator," filed Dec. 28, 2000, Ser. No. 60/259,076.

BRIEF DESCRIPTION OF THE INVENTION

The present invention relates generally to optics, fiber optics, optical networks, and the like. More particularly, the present invention relates to variable polarization controllers and light modulators that have applications in communications, optical detection, optical instrumentation, information display and related areas.

BACKGROUND OF THE INVENTION

Optical fibers are replacing copper cables at a rapid pace as the transition medium for communication systems. Optical fibers are used in the long-haul telecommunication backbone, as well as in regional and metropolitan systems to service the fast growing need of wider bandwidth and faster speed fueled by Internet usage. Switches and attenuators are two key components that are required by current optical communications systems.

Optical switches are used for a number of functions in a communications network, including routing or rerouting of signals and add/drop for multiplexers/demultiplexers. There are currently a number of technologies being employed or evaluated for these functions, including electromechanical, microelectro-mechanical (MEMs), liquid crystal, and acousto-optic.

Today, electromechanical switches are the most common switching elements in use for telecommunications applications. One of their primary advantages is their weak polarization dependence: they have low polarization dependent losses (PDL) and require no additional optical elements to compensate for potential PDL. However, they are bulky and slow (switching times are approximately 50 msec) since they require mechanical movement of a mirror or prism to reroute the signal. They are also less reliable than other technologies because of their moving parts.

MEMs are faster and less bulky, but still rely on mechanical motion so reliability remains an issue. MEMs are micromirrors that are constructed using micro-lithographic techniques. The mirrors are deformed or reoriented using electrostatic forces. Switching speeds are currently limited to >10 msec. Since MEMs rely on steering a reflected beam, controlling the angle of reflection is paramount. At high signal power levels, absorptive heating of the mirror can cause distortion of the mirror surface, which results in the beam being routed in an erroneous direction. Small variations (<1 degree) in signal direction can dramatically increase the coupling losses to the outgoing channel (fiber).

Acousto-optic switches use ultrasonic waves in a birefringent crystal to steer the optical signal to different channels. Such switches are fast (submicrosecond switching is achievable). They also are potentially more reliable than the electromechanical and MEMs technologies since they have no mechanically moving parts. At present, signal losses are relatively high (>2 dB) for a single 1×2 switch that routes an incoming signal to one of two exit ports. The cost of such devices is also high since they require an acoustic (piezoelectric) generator in addition to the optical crystal. Power consumption is also a concern since sound waves must be continuously generated to maintain steering of the signal beam.

Liquid crystal technology has a relatively long history in the prior art for optical switching applications. Liquid crystals are fluids that derive their anisotropic physical properties from the long-range orientational order of their constituent molecules. Liquid crystals exhibit birefringence and the optic axis can be reoriented by an electric field. This switchable birefringence is the mechanism underlying all applications of liquid crystals to optical switching and attenuation.

Reorientation of the liquid crystal molecules under the influence of an applied field introduces elastic strains in the material. These strains stem from constraints imposed on the molecular orientation at the boundaries confining the liquid crystal. These surface constraints are given the term "surface anchoring". In most practical applications, the surface anchoring is strong, so that molecules in the vicinity of a surface are not free to reorient but remain substantially along some preferred direction. In fact, it is this ability to control the liquid crystal surface alignment that makes optical devices employing liquid crystals feasible. As a result of the strain energy, when the field is removed the molecular orientation typically relaxes back to the configuration it had prior to the application of the field. (This is not always the case; there are situations where a liquid crystal has two stable (or metastable) states. In such liquid crystal devices, the electro-optic properties will exhibit hysteresis and possibly bistability in zero fields.)

Two mechanisms have been proposed in the prior art for optical switching using liquid crystals: polarization modulation and total internal reflection (TIR). Note in this context that we are referring to signal redirection to one of at least two channels (1×N switch where N>1). On/off liquid crystal optical switches can also be constructed on the principle of switchable scattering, but this is not the focus of the current invention. (However, it is obvious that a 1×N switch can function as an on/off switch by blocking off N−1 output channels.)

TIR liquid crystal switches rely on the difference in refractive index between the liquid crystal and the confining medium (e.g. glass). By proper choice of materials and angle of incidence of the light at the liquid crystal interface, it is possible to totally internally reflect the light when no field is applied to the liquid crystal. The effective index of the liquid crystal may be changed by reorienting the optic axis of the liquid crystal so that the total internal reflection criterion is no longer met; light then passes through the liquid crystal rather than reflecting from the interface. As with other types of reflective devices, such as MEMs, controlling the reflection angle is critical. Also, since unwanted surface reflections are always present to some degree, crosstalk can be a significant problem.

Polarization modulation is the most common mechanism used in liquid crystal devices for optical switching and attenuation. Switching is achieved between two orthogonal polarization states, for example, two orthogonal linear polarizations or left and right circular polarization. By way of illustration, a simple liquid crystal polarization modulator is illustrated in FIGS. 1a–1c.

FIG. 1a illustrates a layer of nematic liquid crystal sandwiched between two transparent substrates 2 and 3. Transparent conducting electrodes 4 and 5 are coated on the inside surfaces of the substrates. The electrodes are connected to a power source (e.g., a voltage source) 6 through an electrical switch 7. Directly adjacent to the liquid crystal surfaces are two alignment layers 8 and 9 (e.g., rubbed polyimide) that provide the surface anchoring required to orient the liquid crystal The alignment is such that the optic axis of the liquid crystal is substantially the same through the liquid crystal and lies in the plane of the liquid crystal layer when the switch 7 is open.

FIG. 1b depicts schematically the liquid crystal configuration in this case. The optic axis in the liquid crystal 11 is substantially the same everywhere throughout the liquid crystal layer. FIG. 1c shows the variation in optic axis orientation 12 that occurs when the switch 7 is closed as a result of molecular reorientation.

To act as a switch, the modulator must produce two orthogonal polarizations at the exit to the modulator that can then be differentiated with additional optical components. This can be achieved if the liquid crystal layer functions as a switchable half wave retardation plate. To do this, the liquid crystal layer thickness, d, and birefringence, Δn, are chosen so that $$\frac{\Delta nd}{\lambda} = \frac{1}{2} \quad (1)$$

where λ is the wavelength of the incident light. In this situation, if linearly polarized light with wavevector 13 is incident normal to the liquid crystal layer with its polarization 14 making an angle 15 of 45 degrees with the plane of the optic axis of the liquid crystal, the linearly polarized light will exit the liquid crystal with its polarization direction 18 rotated by 90 degrees from the incident polarization.

Referring now to FIG. 1c, when the optic axis in the liquid crystal is reoriented by a sufficiently high field, the optic axis in the central region of the liquid crystal layer is nearly along the propagation direction 13. In this case both the extraordinary 16 and ordinary components 17 of the polarization see nearly the same index of refraction. Ideally, if everywhere in the liquid crystal layer the optic axis were parallel with the direction of propagation, the medium would appear isotropic and the polarization of the exiting light would be the same as the incident light.

This polarization conversion scheme provides the foundation for a number of electro-optic devices. If a linear polarizer is placed at the exit to the modulator, a simple on/off switch is obtained. If a polarizing beam splitter is placed at the exit, a 1×2 switch can be realized.

In practice, when a field is applied to the liquid crystal, the optic axis does not reorient everywhere along the propagation direction. There are two regions near each surface indicated by 11 and 12 in FIG. 1c where the optic axis is constrained to remain substantially in the film plane for surface anchoring. This region produces some remnant birefringence that prevents the light from exiting the liquid crystal linearly polarized As a consequence this produces cross talk leakage into the "off" channel. For a VOA, this effect reduces the dynamic range of the attenuation to approximately −20 dB. To achieve less cross talk and more dynamic range (−30 to −40 dB), a different mode, such as a twisted nematic polarization modulator must be used.

Before leaving a discussion of this simple half wave modulator it is useful for later understanding of the current invention to give a geometrical representation of the polarization as afforded by the Poincare sphere. FIG. 2a shows a projection of the Poincare sphere as viewed from the top. In this view, circular polarization 21 is at the center of the projection; all states of linear polarization occur on the equator—the outer most circle. Two diametrically opposed points on the sphere correspond to orthogonal polarizations. For example, the two points 22 and 23 represent orthogonal linear polarizations as do 24 and 25. When light propagates through a liquid crystal layer, or any other birefringent medium, its polarization will change continuously; this change can be mapped as a continuous curve on the sphere. The curve 26 shown on the sphere in FIG. 2a represents the changes in polarization that are experienced for the situation of FIGS. 1b and 1c. Point 22 corresponds to the incident polarization and point 23 to the exit polarization of the unactivated liquid crystal cell. They are orthogonal. According to FIG. 2b, there is remnant elliptical polarization 27 at the exit surface when a voltage is applied, as discussed above.

As is well known, it is possible to obtain substantially orthogonal linear polarizations for both activated and inactivated liquid crystals if a twisted nematic with 90 degrees twist—a 90° TN—is employed, as shown in FIG. 3. For the twisted nematic in the unactivated state, the local optic axis in the liquid crystal lies substantially in the plane of the liquid crystal layer and rotates substantially uniformly from one surface to the other. For the exit polarization to be orthogonal to the incident polarization, the 90° TN must satisfy one of the so-called $n^{th}$ minimum conditions. For a given liquid crystal material birefringence, the thinnest liquid crystal layer thickness for which the incident and exit polarizations are orthogonal is called the first minimum condition.

The polarization curve 31 for a first minimum TN with no voltage applied across the layer is shown in FIG. 4a. The incident polarization 22 and exit polarizations 23 are orthogonal. To obtain this polarization curve, the optic axis of the liquid crystal at the entrance surface 28 must be either parallel or orthogonal to the incident polarization vector 29. If the angle 30 (β) between the incident polarization and optic axis is not zero or 90 degrees, the exit polarization will still be orthogonal to the incident polarization, but the shape of the polarization curve will be different. For example, the polarization curve 32 results when β is 45 degrees.

With reference to FIG. 4b, when a sufficient voltage is applied to the electrodes of a 90° TN the polarization curve 33 results. While not obvious from the figure, the incident polarization becomes elliptically polarized when passing through the entrance region of the liquid crystal; it then returns to nearly linear polarization upon passing through the exit region. This self-compensation effect requires that the optic axes at the entrance and exit surfaces be nearly orthogonal.

There is a serious shortcoming to all single cell liquid crystal switches that use birefringence for polarization conversion between two orthogonal polarizations. According to Equation 1, the conversion is complete only when the birefringence, layer thickness and wavelength satisfy a single condition. When this condition is not satisfied, elliptical polarization—or, at least, a non-orthogonal linear polarization—is produced at the exit surface of the liquid crystal, resulting in cross talk. This is illustrated in FIG. 5, which shows the attenuation of a standard halfwave retarder 34 and a first minimum 90 degree TN 35 when placed between parallel polarizers. The attenuation is a maximum at the half wave criterion, chosen here at 1550 nm wavelength. The attenuation decreases to less than 30 dB within +/−50 nm of the optimum wavelength. For some applications, this may be sufficient bandwidth, but because liquid crystal birefringence is strongly temperature dependent, it is not possible to maintain the location of the band as temperature changes. Typical applications in photonics require at least a 50° C. or larger temperature range. This will result in a 10 to 20 percent change in birefringence of the liquid crystal.

The easiest solution to this problem is to use temperature control to maintain the liquid crystal at some designoptimized temperature. However, this requires additional electronics and a bulkier more expensive package for the modulator.

A better solution is to have an optically self-compensating structure for the modulator. This can be achieved with a design that is achromatic over sufficiently wide bandwidth that the required design bandwidth is maintained even over temperature. Such a scheme exists in the prior art, as described in U.S. Pat. No. 5,658,490 (the '490 patent). This scheme employs three standard half wave uniaxial retarders to produce an achromatic response for both switching states of a 1×2 switch over a much larger bandwidth than a single standard half-wave retarder. Two of the films are passive while the third consists of a ferro-electric smectic liquid crystal whose optic axis can be reoriented by the application of an electric field. It is well known that three half-wave retarders with properly oriented optic axes can produce a compound half-wave retarder with achromatic performance over a wide wavelength range. The key to the approach is the proper selection of the optic axis orientations of the three films. Switching of the smectic liquid crystal must produce two orthogonal polarization states, and both optic axis orientations must satisfy the criterion for achromatic performance. The bandwidth of the two states is not the same. The wavelength dependence of transmission for the state with minimum bandwidth (no voltage state) 36 is displayed in FIG. 4.

Unfortunately, for this scheme to work effectively, the switching angle between the two optic axis orientations of the smectic must be 45 degrees. Since this angle is very temperature dependent, the cross talk increases too dramatically with temperature, so again active compensation is needed. The '490 patent proposes a different embodiment where the smectic is replaced by two homogeneously aligned uniform nematics. Their optic axes are oriented in the two required directions. The modulator is switched by applying a voltage to one cell or the other to select the desired optic axis. This approach has the drawback cited for the single uniform half-wave retarder described earlier, namely, the remnant surface retardation produces substantial cross talk between the channels.

Accordingly, for the advantages of liquid crystal devices in fiber optic networks to be realized (e.g., reliability, cost, and ease of fabrication) a device with achromatic performance over wide bandwidth for two switched states is desirable. The bandwidth should be sufficiently wide (e.g. +/−20% of the central wavelength) to ensure sufficient overlapping bandwidth to allow wide (e.g., >50° C.) temperature operation.

SUMMARY OF THE INVENTION

The apparatus of the invention includes an achromatic half wave plate with a first twisted nematic liquid crystal layer, a second twisted nematic liquid crystal layer, and a uniaxial half wave plate between the first twisted nematic liquid crystal layer and the second twisted nematic liquid crystal layer. In one embodiment the first twisted nematic liquid crystal layer and the second twisted nematic liquid crystal layer have an identical twist angle of 135 degrees. The optic axis at the entrance of the first twisted nematic liquid crystal layer is substantially orthogonal to the optic axis at the exit of the second twisted nematic liquid crystal layer.

The invention also includes a method of achromatic electro-optical modulation. A linearly polarized incident beam is applied to an input surface of a first twisted nematic liquid crystal layer. The linearly polarized incident beam is processed through a uniaxial half wave plate and a second twisted nematic liquid crystal layer to produce a substantially orthogonally polarized beam at an output surface of the second twisted nematic liquid crystal layer.

Advantageously, the apparatus of the invention is reliable, easy to manufacture and has a relatively low cost. The invention provides achromatic performance over a wide bandwidth for two switched states. In one embodiment, the invention provides more than 30 db of isolation between two polarization states over a wavelength range of +/−20% from the central wavelength. The device provides substantially uniform output polarization over a temperature range of 50° C. or more for a wavelength range of +/−2% of the central wavelength of an incident beam.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention provides a switchable polarization converting device and method that converts one linear polarization into its orthogonal linear polarization either in analog or digital fashion. With proper choice of materials and device structure, a polarization converter with >30 dB of isolation between the two polarization states can be achieved over a wavelength range of +/−20% of the central wavelength.

The device consists of a stack of one uniformly aligned nematic sandwiched between two twisted nematic layers. The uniformly aligned middle layer is chosen to satisfy Equation 1 at the central wavelength (i.e., it acts as a half wave plate and its optic axis is oriented at 45 degrees to the incident linear polarization of the light). The two twisted nematic cells have identical twist angles but different orientations of their surface alignment. The choice of orientation angles for the twisted layers is determined by the twist angle. By electrically switching the three layers, an optical switching element or VOA is obtained when combined with other optical elements such as polarizers and beam splitters. To achieve minimal cross talk between both polarization states and maximum bandwidth, the twist angle of the twisted nematic cells should be approximately 135 degrees.

Figure 6:
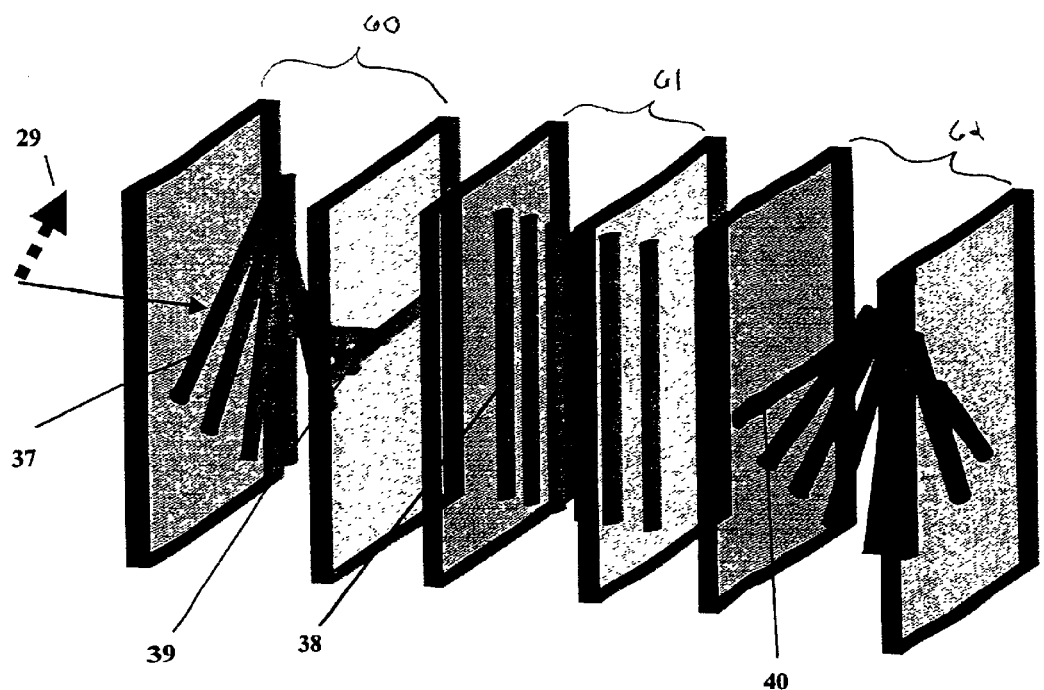
FIG. 6 illustrates two 135° twisted nematics and a uniform half wave plate nematic formed in accordance with an embodiment of the invention.

FIG. 6 shows a schematic representation of the invention. Three nematic cells 60, 62, and 62 are stacked adjacent to each other. The first twisted nematic liquid crystal layer 60 and the second twisted nematic liquid crystal layer 62 may be formed with polymer liquid crystal films. The uniaxial half wave plate 61 may be formed of a crystalline birefringent material, a nematic liquid crystal, a smectic A liquid crystal, or a smectic C* liquid crystal. Preferably, the remnant surface orientation of each liquid crystal surface is compensated by another liquid crystal surface with an orthogonal remnant surface orientation.

Normally incident linearly polarized light enters from the left in the figure. In this preferred embodiment, the optic axis 37 at the entrance side of the first liquid crystal layer 60 is parallel to the incident polarization direction 29. With no voltage applied, the optic axis rotates nearly uniformly with a total twist angle of 135 degrees. The optic axis 38 of the second liquid crystal layer 61 is uniform and makes an angle of 45 degrees to the incident polarization 29 and 90 degrees to the optic axis 39 at the exit of the first layer 60.

The third liquid crystal layer 62 has the same 135 degrees twist as the first cell 60, but the optic axis 40 at its entrance is parallel to the optic axis at the exit surface of the first cell. By way of example, both twist cells are shown with right-handed twist sense.

Figure 1A:
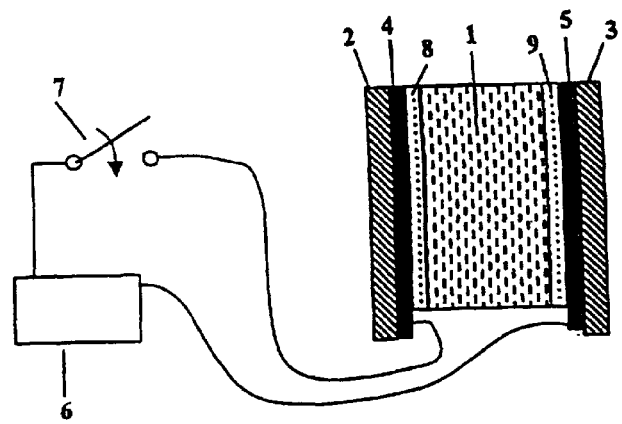
FIGS. 1a–1c illustrate the basic operation of a prior art single cell liquid crystal polarization modulator.
Figure 1B:
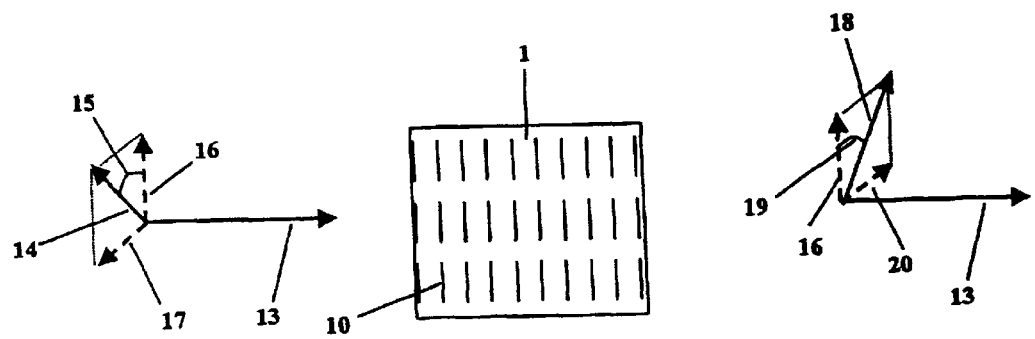
Figure 1C:
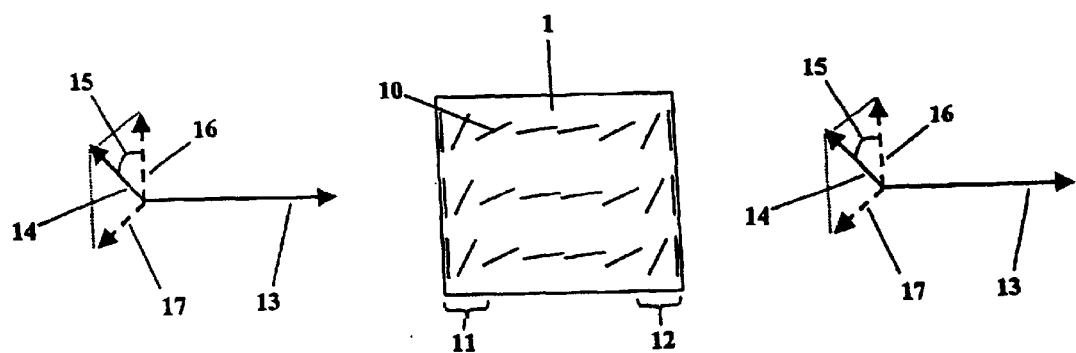
Figure 2A:
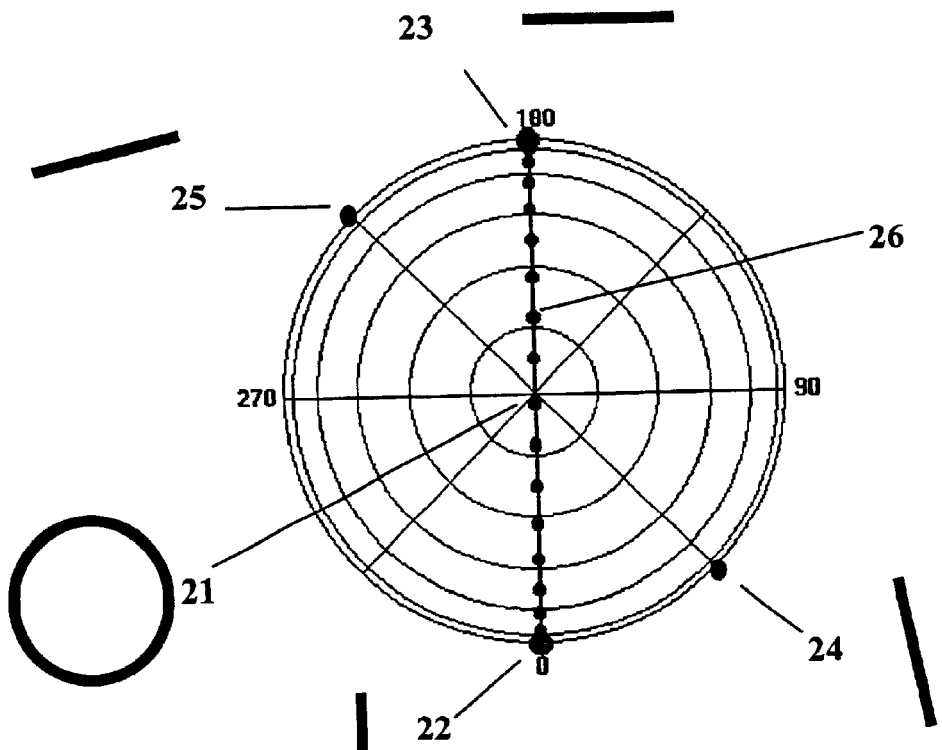
FIGS. 2a–2b shows polarization curves for a switchable half wave retarder as viewed on a Poincare sphere.
Figure 2B:
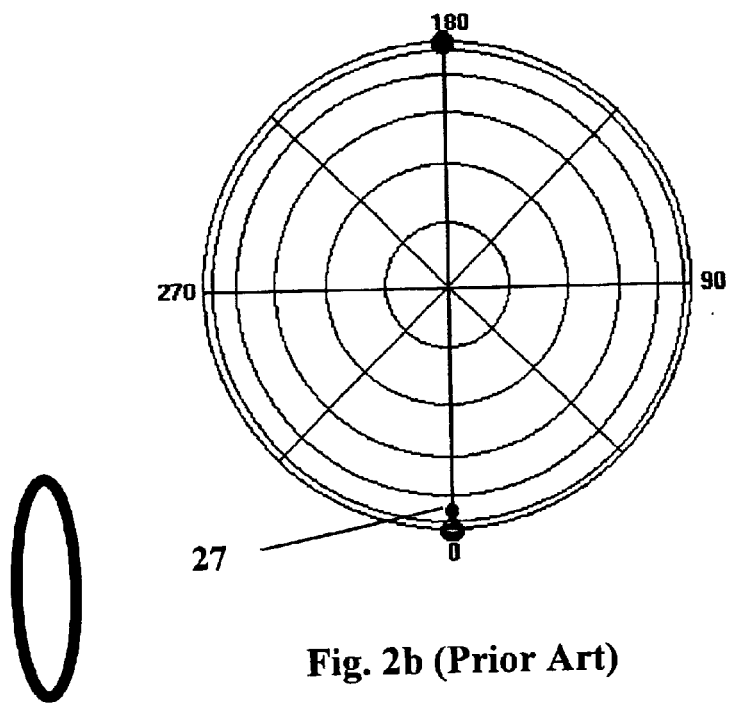
Figure 3:
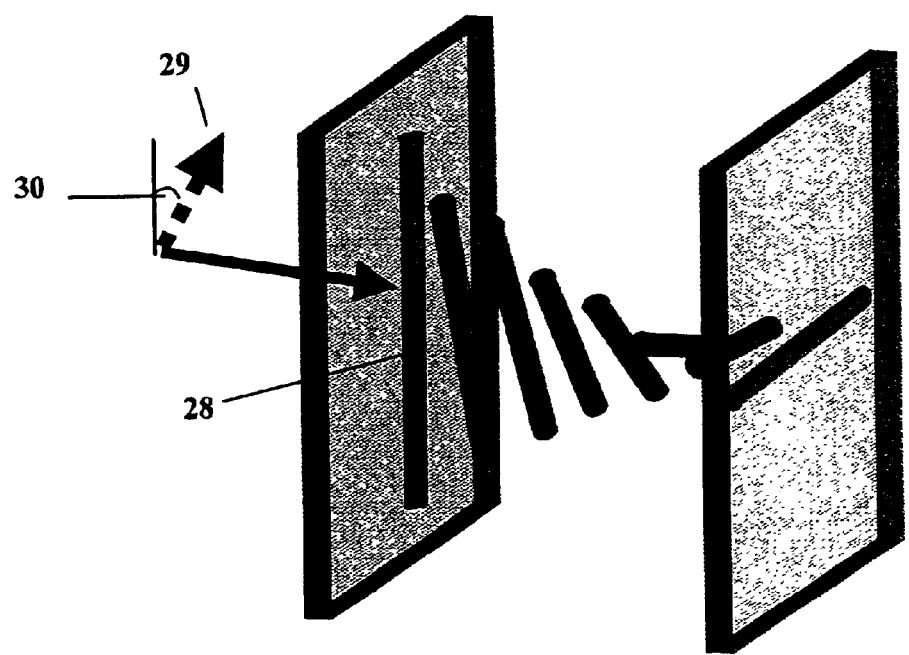
FIG. 3 is a schematic representation of a 90° twisted nematic layer with normally incident linearly polarized light.
Figure 4A:
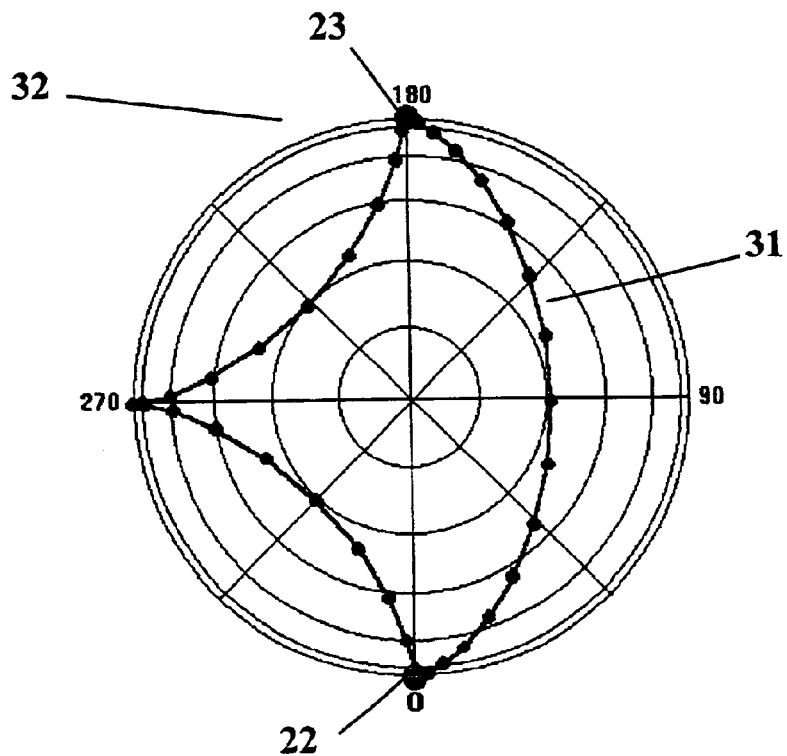
FIGS. 4a–4b illustrate Poincare sphere polarization curves for a first minimum 90° twisted nematic with no voltage applied and with a high voltage applied, respectively.
Figure 4B:
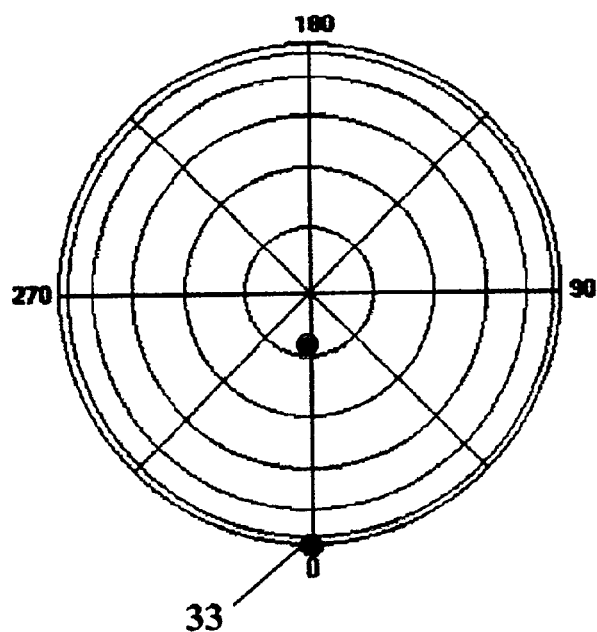
Figure 5:
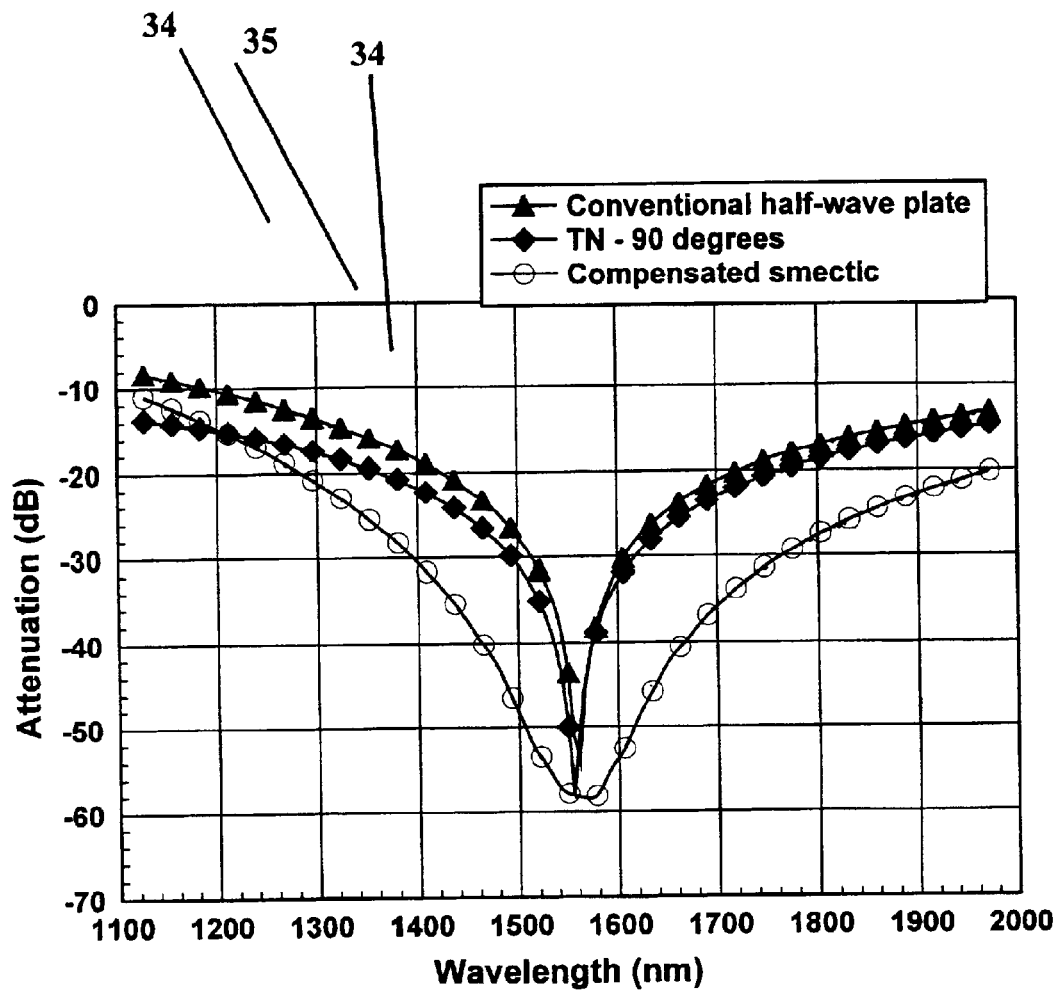
FIG. 5 is a plot of the Transmission versus wavelength for a conventional half wave plate, conventional 90° twisted nematic, and the achromatic compensated smectic.
Figure 7:
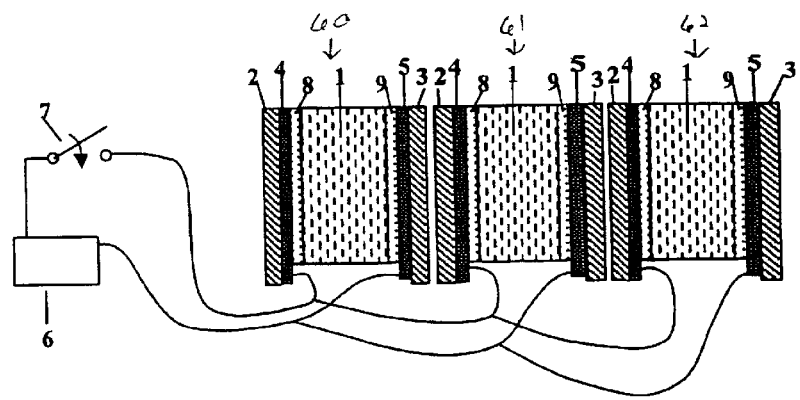
FIG. 7 is a schematic of the three liquid crystal layers of FIG. 6 connected electrically in parallel.

FIG. 7 shows more details of the device structure. The details of the individual layers 60, 61, and 62 are consistent with the device of FIG. 1a. The three cells can be driven independently or connected electrically in parallel, as is the case in FIG. 7. Not shown in the cell construction is a thin alignment layer at each liquid crystal surface, for example rubbed polyimide, required to produce the required surface alignment direction for the liquid crystal.

The power source 6 applies a sufficiently high field to the cells 60, 61 and 62 to produce liquid crystal layers that are simultaneously reoriented to a substantially homeotropic state. The power source 6 applies a sufficiently high field to the cells 60, 61 and 62 to produce substantially no polarization upon an incident beam.

To operate effectively over a wide bandwidth, the thickness of the liquid crystal layers must be chosen correctly. First, both TNs should be of the same thickness $d_{TN}$ and contain liquid crystals whose birefringence An satisfies the condition:

$$\frac{\Delta n d_{TN}}{\lambda_o} = \eta \quad (2)$$

Here $\lambda_o$ is the central wavelength in the band, and $\eta$ is a constant that depends on the twist of the outer nematic layers. For a 135 degree twist, $\eta=0.66$ and for zero twist $\eta=0.5$.

With the liquid crystal structure and orientation as described above, the whole structure acts as an achromatic half wave plate for all angles of normally incident polarized light. In particular, when the polarization of the incident light is linear and makes an angle of 45 degrees with the optic axis at the entrance to the first cell, the light is converted to near linear outgoing polarization over a substantial range of wavelengths.

Figure 8:
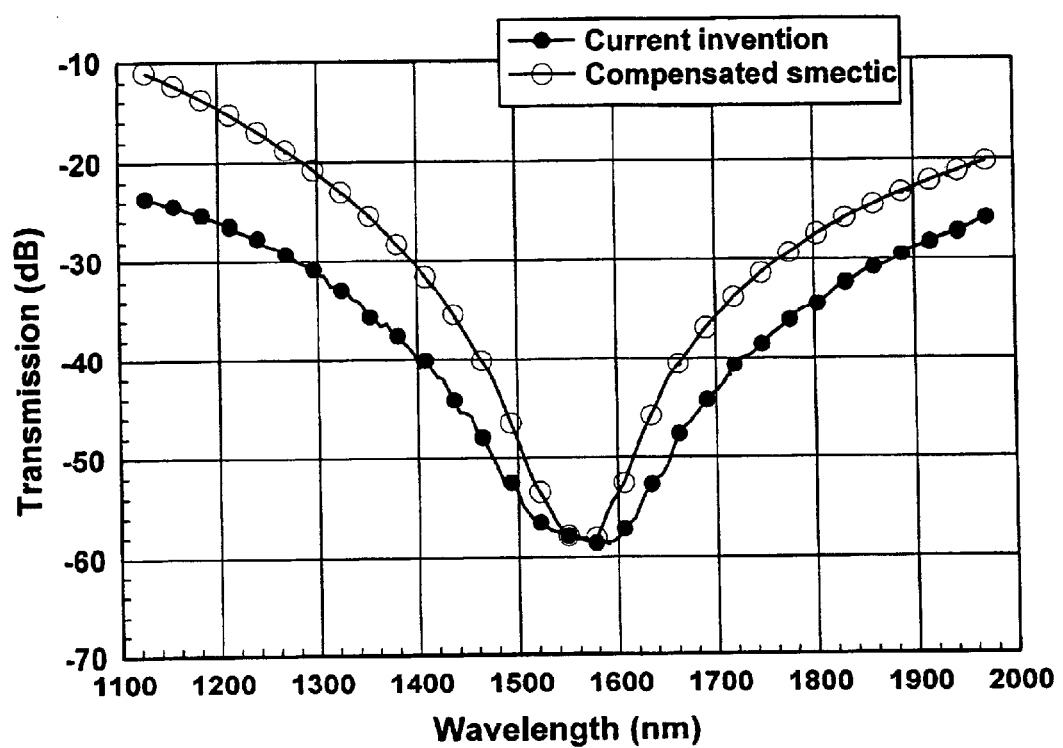
FIG. 8 is a plot of the transmission versus wavelength for the current invention when placed between parallel polarizers.

Computer simulation of the optical performance of the compensated liquid crystal modulator according to the embodiment of FIG. 6 is shown in FIG. 8. The modulator is placed between parallel ideal polarizers. Data are for the no voltage state. This embodiment has a bandwidth of approximately 600 nm when the central wavelength is chosen as 1550 nm. This is 50 percent larger than achieved for the prior art of U.S. Pat. No. 5,658,490, which is also shown in FIG. 8 for comparison.

Figure 9:
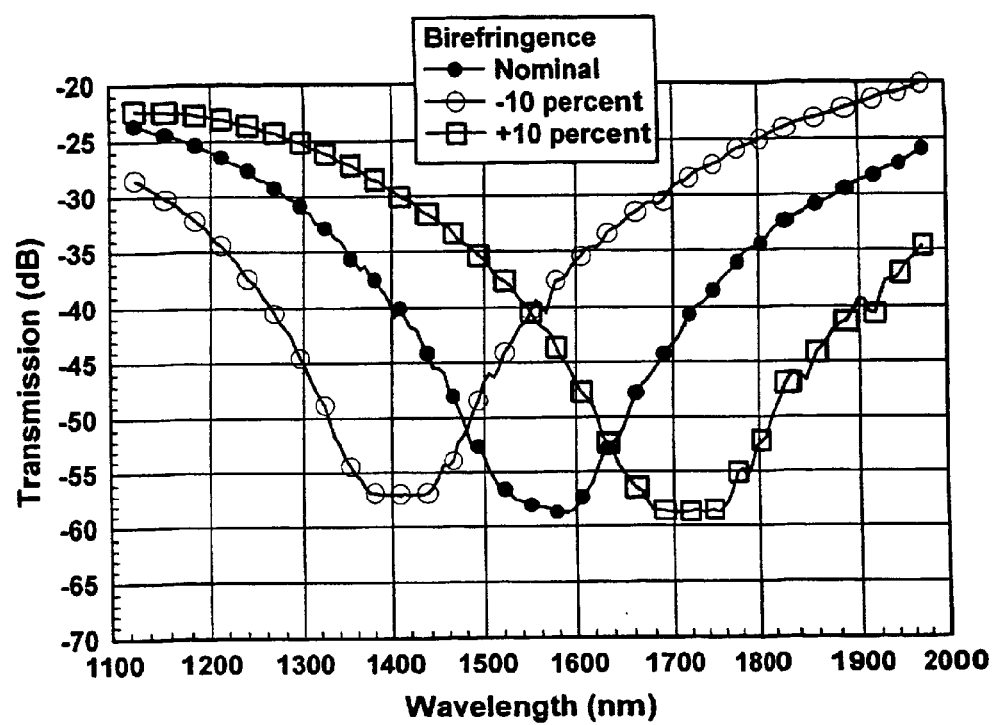
FIG. 9 is a plot of the transmission versus wavelength for an embodiment of the invention with three different values of the birefringence: nominal, −10%, and +10%.

FIG. 9 shows the calculated optical performance for the preferred embodiment of FIG. 6 when the birefringence of the liquid crystal in all cells is varied by +/−10 percent to simulate temperature effects. The calculations are for the same situation as FIG. 8. The wavelength region for overlap of the curves for greater than 30 dB of attenuation is 300 nm. For the prior art of U.S. Pat. No. 5,658,490, the 30 dB band is less than 100 nm. Hence, this invention offers a substantial (>2 times) increase in bandwidth for birefringence changes corresponding to a temperature range of >50° C.

Figure 10A:
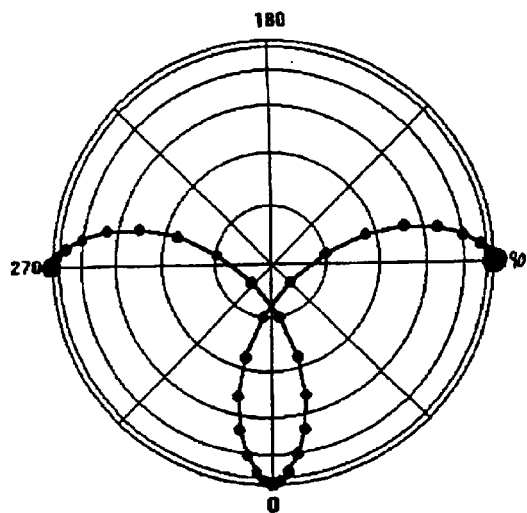
FIGS. 10a–10c shows polarization curves for the current invention when the retardation product for each layer is optimal, 10 percent too low, and 10 percent too high, respectively.
Figure 10B:
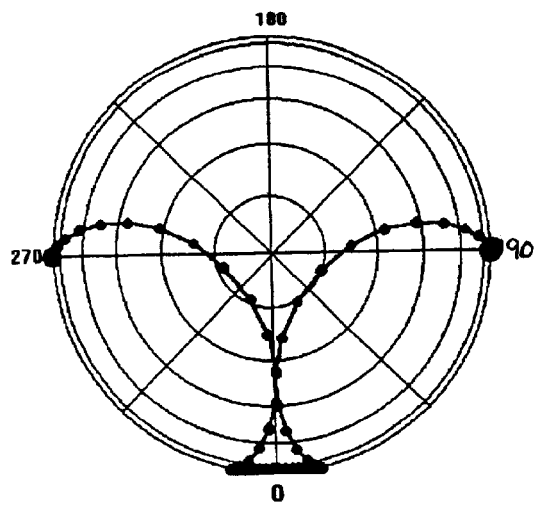
Figure 10C:
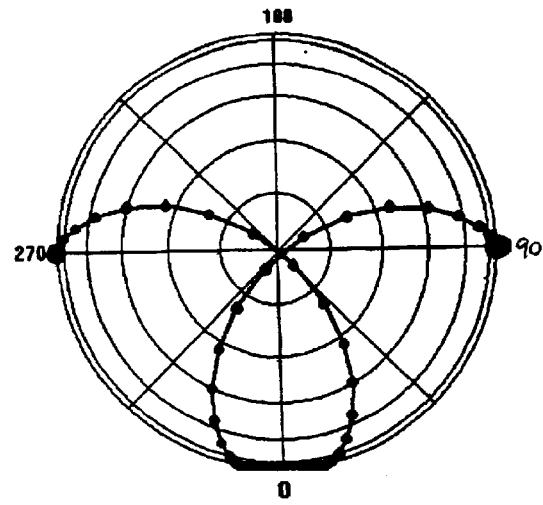

The optical compensation effect is shown graphically on the Poincare sphere in FIGS. 10a–10C. FIG. 10a is the polarization curve for the nominal situation where the middle layer satisfies Equation 1 and the 135 degree twisted layers satisfy Equation 2. In this situation, the light exits the first layer linearly polarized parallel to the optic axis of the uniform middle layer, so that no change in polarization occurs during passage through that layer. When the retardation of all layers (left hand sides of Equations 1 and 2) are decreased by 10 percent, the polarization curve of FIG. 10b results. The decreased polarization change occurring in each twisted layer is compensated now by additional retardation from the central layer, again resulting in orthogonal linear polarization exiting the stack. FIG. 10c shows similar compensation when the retardation of all layers is increased by 10 percent So far only the no-voltage situation has been considered. To achieve a well-compensated activated state, it is necessary that the surface regions of the three layers compensate in the manner described previously for the activated 90 degree TN. It is not necessary that the self-compensating surface regions be in the same liquid crystal layer. For the preferred embodiment of FIG. 6, the surface regions of the middle liquid crystal layer are compensated by the adjacent twisted nematic layers, which are orthogonal. With these layers optically compensated, the outermost surface layers of the 135 degrees TNs, which are orthogonal, compensate each other. We observe that to achieve this complete compensation for the activated state, the nematic layers must have a twist angle θ, $\lambda_o$ in radians, which satisfies:

$$\theta = \frac{\pi}{4} + m\frac{\pi}{2} \quad (3)$$

where m is an integer. However, it is not possible to obtain self-compensation for both the off and activated states for all m. In particular, the smallest angle which produces compensation for both states corresponds to m=1, i.e., 135 degrees.

Figure 11:
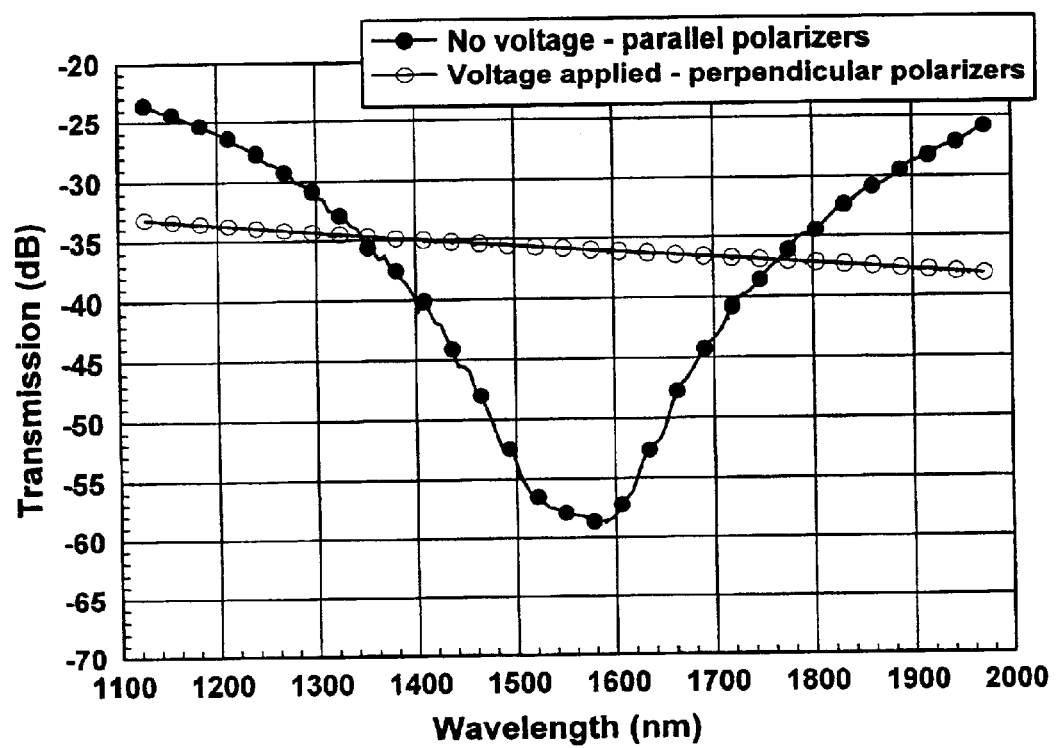
FIG. 11 is a plot of the transmission versus wavelength for the no voltage state between parallel polarizers and the voltage-activated state between perpendicular polarizers.

FIG. 11 shows the calculated optical performance for both states according to the embodiment of FIG. 6. The transmission for the no voltage state is identical to that of FIG. 8. The transmission of the activated state was obtained for crossed polarizers. Data for the activated state was achieved for an applied voltage of 10 volts across each liquid crystal layer, the liquid crystal properties of the layers were identical: birefringence $\Delta n 0.173$; dielectric anisotropy $\Delta \epsilon = 5.9$; elastic constants $K_{11}=13.2$ pN, $K_{22}=8.0$ pN, $K_{33}=21.4$ pN. activated state exhibits >30 dB of attenuation over a much wider wavelength region than the no-voltage state.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An achromatic half wave plate, comprising:
    a first twisted nematic liquid crystal layer;
    a second twisted nematic liquid crystal layer; and
    a uniaxial half wave plate between said first twisted nematic liquid crystal layer and said second twisted nematic liquid crystal layer,
    wherein the optic axis at the entrance of said uniaxial half wave plate makes an angle of 45 degrees to the polarization of said incident beam, wherein said incident beam is linearly polarized, and an angle of 90 degrees to the optic axis at the exit of said first twisted nematic liquid crystal layer,
    wherein the optic axis at the entrance of said second twisted nematic liquid crystal layer is parallel to the optic axis at the exit of said first twisted nematic liquid crystal layer and makes an angle of 90 degrees to the optic axis of said uniaxial half wave plate.

2. The achromatic half wave plate of claim 1 wherein said first twisted nematic liquid crystal layer and said second twisted nematic liquid crystal layer have an identical twist angle.

3. The achromatic half wave plate of claim 2 wherein said twist angle is approximately 135 degrees.

4. The achromatic half wave plate of claim 1 wherein said first twisted nematic liquid crystal layer and said second twisted nematic liquid crystal layer include polymer liquid crystal films.

5. The achromatic half wave plate of claim 1 wherein said uniaxial half wave plate is constructed of a crystalline birefringent material.

6. The achromatic half wave plate of claim 1 wherein said uniaxial half wave plate is a nematic liquid crystal.

7. The achromatic half wave plate of claim 1 wherein said uniaxial half wave plate is a smectic A liquid crystal.

8. The achromatic half wave plate of claim 1 wherein said uniaxial half wave plate is a smectic C* liquid crystal.

9. The achromatic half wave plate of claim 1 further comprising a power source to apply a sufficiently high field to said first twisted nematic liquid crystal layer, said second twisted nematic liquid crystal layer, and said uniaxial half wave plate to produce liquid crystal layers that are simultaneously reoriented to a substantially homeotropic state.

10. The achromatic half wave plate of claim 1 wherein the remnant surface orientation of each liquid crystal surface is compensated by another liquid crystal surface with an orthogonal remnant surface orientation.

11. The achromatic half wave plate of claim 1 further comprising a power source to apply a sufficiently high field to said first twisted nematic liquid crystal layer, said second twisted nematic liquid crystal layer, and said uniaxial half wave plate to produce substantially no alteration of the polarization of an incident beam.

12. The achromatic half wave plate of claim 1 configured to provide approximately 30 db or more isolation between two polarization states over a wavelength range of +/−20% of a central wavelength.

13. The achromatic half wave plate of claim 1 wherein said uniaxial half wave plate has an optic axis oriented at approximately 45 degrees to the polarization of an incident beam.

14. The achromatic half wave plate of claim 1 wherein said first twisted nematic liquid crystal layer and said second twisted nematic liquid crystal layer have an identical twist angle and different surface alignment orientations selected as a function of said twist angle.

15. The achromatic half wave plate of claim 1 configured to produce substantially uniform output polarization over at least a 50° C. temperature range over a wavelength range of +/−2% of a central wavelength.

16. The achromatic half wave plate of claim 1 wherein the optic axis at the entrance of said first twisted nematic liquid crystal layer is substantially orthogonal to the optic axis at the exit of said second twisted nematic liquid crystal layer.

17. The achromatic half wave plate of claim 1 wherein the optic axis at the entrance of said first twisted nematic liquid crystal layer is parallel to the polarization of an incident beam.

* * * * *